(12) United States Patent
Han (10) Patent No.: US 11,636,775 B2
(45) Date of Patent: Apr. 25, 2023

(54) HONEYCOMB STRUCTURE FOR AUTOMATED POOL ASSEMBLY OF TEST QUESTIONS FOR TEST ADMINISTRATION

(71) Applicant: Graduate Management Admission Council, Reston, VA (US)

(72) Inventor: Kyungtyek Han, Chantilly, VA (US)

(73) Assignee: GRADUATE MANAGEMENT ADMISSION COUNCIL, Reston, VA (US)

( * ) Notice: Subject to any disclaimer, the term of this patent is extended or adjusted under 35 U.S.C. 154(b) by 177 days.

(21) Appl. No.: 17/196,092

(22) Filed: Mar. 9, 2021

(65) Prior Publication Data

US 2022/0293000 A1    Sep. 15, 2022

(51) Int. Cl.
*G09B 7/077*   (2006.01)
*G09B 7/02*    (2006.01)
*G09B 7/10*    (2006.01)

(52) U.S. Cl.
CPC ............... *G09B 7/077* (2013.01); *G09B 7/02* (2013.01); *G09B 7/10* (2013.01)

(58) Field of Classification Search
CPC ................................. G09B 7/077; G09B 7/02
See application file for complete search history.

(56) References Cited

U.S. PATENT DOCUMENTS

| | | | | |
|---|---|---|---|---|
| 5,059,127 A * | 10/1991 | Lewis | ...................... | G09B 7/00 434/362 |
| 6,000,945 A * | 12/1999 | Sanchez-Lazer | ........ | G09B 7/02 434/350 |
| 6,234,806 B1 * | 5/2001 | Trenholm | ................ | G09B 7/04 434/323 |
| 8,591,237 B2 * | 11/2013 | Belov | ...................... | G09B 7/02 434/353 |
| 8,699,941 B1 * | 4/2014 | Holt | ......................... | G09B 7/02 434/362 |
| 9,847,039 B2 | 12/2017 | Guo et al. | | |

(Continued)

OTHER PUBLICATIONS

L.V. Kantorovich, "Mathematical Methods of Organizing and Planning Production", 1939, Management Science, pp. 366-422, https://doi.org/10.1287/mnsc.6.4.366 (Year: 1939).*

(Continued)

*Primary Examiner* — James S. McClellan
(74) *Attorney, Agent, or Firm* — Panitch Schwarze Belisario & Nadel LLP (57) ABSTRACT

An automated method of assembling computerized adaptive test (CAT) pools of test items is provided. A plurality of item bins is created. Each item bin is associated with a different content domain, and each item bin includes only items associated with its respective content domain. The items in each item bin are grouped into a plurality of individual cells, wherein each item is placed in only one of the individual cells, and each cell includes a plurality of items which span a range of difficulty levels. The grouping is performed by linear programming at the individual cell level. One or more pools of items are assembled from a random selection of cells across the item bins, wherein there is only one cell for each item bin. The CAT is administered by randomly assigning each test taker to one of the pools of items.

18 Claims, 6 Drawing Sheets
(1 of 6 Drawing Sheet(s) Filed in Color)

Honeycomb Structure and Procedure #2

(56) References Cited

U.S. PATENT DOCUMENTS

| | | | | |
|---|---|---|---|---|
| 2002/0184265 | A1* | 12/2002 | Gupta | G06F 40/10 434/362 |
| 2004/0076941 | A1* | 4/2004 | Cunningham | G09B 7/02 434/350 |
| 2006/0035207 | A1* | 2/2006 | Henson | G09B 7/00 434/350 |
| 2013/0224703 | A1* | 8/2013 | Jones | G09B 19/00 434/236 |
| 2015/0072332 | A1* | 3/2015 | Lin | G06Q 30/0202 434/322 |

OTHER PUBLICATIONS

G.B. Dantzig, "Reminiscences about the Origins of Linear Programming", Apr. 1981, Stanford Univ., pp. 1-11, https://apps.dtic.mil/sti/citations/ADA112060 (Year: 1981).*

T. Thomas, "Item-presentation controls for multidimensional item pools in computerized adaptive testing", 1990, Behavior Research Methods, Instruments & Computers, pp. 247-252, https://link.springer.com/content/pdf/10.3758/BF03203154.pdf (Year: 1990).*

M.D. Reckase, "Designing item pools to optimize the functioning of a computerized adaptive test", 2010, Psychol. Test Assess. Model., pp. 255-274, https://www.psychologie-aktuell.com/fileadmin/download/ptam/2-2010/01_Reckase.pdf (Year: 2010).*

B.P. Veldkamp and M. Matteucci, "Bayesian Computerized Adaptive Testing", Mar. 2013, Ensaio: aval. pol. públ. Educ., pp. 57-82, https://doi.org/10.1590/S0104-40362013005000001 (Year: 2013).*

A. Ouali, S. Loudni, Y. Lebbah, P. Boizumault, A. Zimmermann, and L. Loukil, "Efficiently Finding Conceptual Clustering Models with Integer Linear Programming", 2016, IJCAI'16, pp. 647-654, https://hal.archives-ouvertes.fr/hal-01597804/file/ijcai16.pdf (Year: 2016).*

A. Miyauchi, T. Sonobe, and N. Sukegawa, "Exact Clustering via Integer Programming and Maximum Satisfiability", Feb. 2018, AAAI-18, pp. 1387-1394, https://ojs.aaai.org/index.php/AAAI/article/view/11519 (Year: 2018).*

K.C.T. Han, "Components of the item selection algorithm in computerized adaptive testing", Mar. 2018, J. Educ. Eval. Health Prof., pp. 1-13, https://doi.org/10.3352/jeehp.2018.15.7 (Year: 2018).*

"IMS Global Computer Adaptive Testing (CAT) Specification," IMS Candidate Final Public Version 1.0, IMS Candidate Final Public, Date Issued: Nov. 9, 2020, Copyright © 2021 IMS Global Learning Consortium, Inc., 67 pages (pp. 1-38 is a printout of an HTML version of the document, and pp. 39-67 provides a PDF version which properly reproduces Figures 1-4 which are not properly illustrated in the HTML version).

"Solving mixed integer programming problems (MIP)." IBM Corp., downloaded from: <https://www.ibm.com/support/knowledgecenter/SSSA5P>. . . , download date: Feb. 24, 2021, 2 pages.

"Understanding the Structure and Content of the Test," Copyright © 2009 Pearson Education, Inc., 2 pages.

"User's Manual for CPLEX," IBM Corp., downloaded from: https://www.ibm.com/support/knowledgecenter/SSSA5P . . . , download date: Feb. 24, 2021, 3 pages.

Han et al., "Item Pool Construction Using Mixed Integer Quadratic Programming (MIQP)," GMAC Research Reports, RR-14-01, 20 pages (Jun. 10, 2014).

Woo et al., "Understanding the Impact of Enemy Items on Test Validity and Measurement Precision," CLEAR Exam Review, vol. XXI, No. 1, pp. 15-17 (5 pages) (Winter 2010).

* cited by examiner

Figure 1 (Prior art)

Conventional Pool Structure & Assembly Approach

Step 1: Cellular-Level Construction

| Item Bin | Honeycomb Cell | | | | |
|---|---|---|---|---|---|
| 1 | 1-1 | 1-2 | 1-3 | ... | 1-j |
| 2 | 2-1 | 2-2 | | ... | 2-j' |
| ... | | | ... | | |
| 23 | 26-1 | 26-2 | 26-3 | ... | 26-j'' |
| | Reserved Cells | | Cells for OP Pools | | |

Figure 2

Honeycomb Structure and Procedure #1

Figure 3

Honeycomb Structure and Procedure #2

Figure 4: Comparison of Consistency in Pool Information Functions between the traditional Repeated Random Sampling method (Left) and the New Honeycomb-based Approach using new MIP Models (Right)

| Model | Demonstration | Main Part of Model |
|---|---|---|
| Model 1:<br><br>Single Bounded Model<br><br>(SBM) |  | Minimize<br><br>$$\sum_{p=1}^{P}\int_{-\infty}^{\infty}[\sum_{j=1}^{J}I(j|\theta)x_{pj}-\tau_\theta]d\theta$$<br><br>subject to<br><br>$\sum_{j=1}^{J}I(\theta)x_j-\tau_\theta \geq 0$, for each $p$. |
| Model 2:<br><br>Minimized Squared Difference Model<br><br>(MSDM) |  | Minimize<br><br>$$\sum_{p=1}^{P}\int_{-\infty}^{\infty}[\sum_{j=1}^{J}I(j|\theta)x_{pj}-\tau_\theta]^2 d\theta$$ |

Figure 5: Mixed Integer Programming (MIP) models developed and used within IBM's CPLEX Optimization platform for Honeycomb-based pool assembly.

*Figure 6*

HONEYCOMB STRUCTURE FOR AUTOMATED POOL ASSEMBLY OF TEST QUESTIONS FOR TEST ADMINISTRATION

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

A standardized test is a test that is administered and scored in a consistent, or "standard," manner. As discussed in U.S. Pat. No. 6,234,806 (Trenholm et al.) and U.S. Pat. No. 9,847,039 (Guo et al.), both of which are incorporated by reference herein, standardized tests are administered to examinees (also, referred to herein as "test-takers," "respondents," or "users") for educational testing and evaluating particular skills. Academic skills tests include the SAT, LSAT and GMAT® exams.

As known in the art, test questions are often referred to as "items." A test question or "item" may require only a single response or answer, or it may have multiple subparts that each require a separate answer. Standardized tests are assembled from a "pool of items," also referred to as an "item pool." An item pool may include a plurality of distinct "content areas," also referred to as "content domains." Content domains are groupings of competencies that reflect major domains of subject area knowledge for the test. For example, content domains for a test in the field of social science may include the following five content domains: historiography and world history, U.S. history, geography and culture, government, and economics. A test may include different percentages of items from each content domain, or the test may include an equal weighting of different content domains. An "item bin" contains all items that relate the same content domain (content area).

Figure 1:
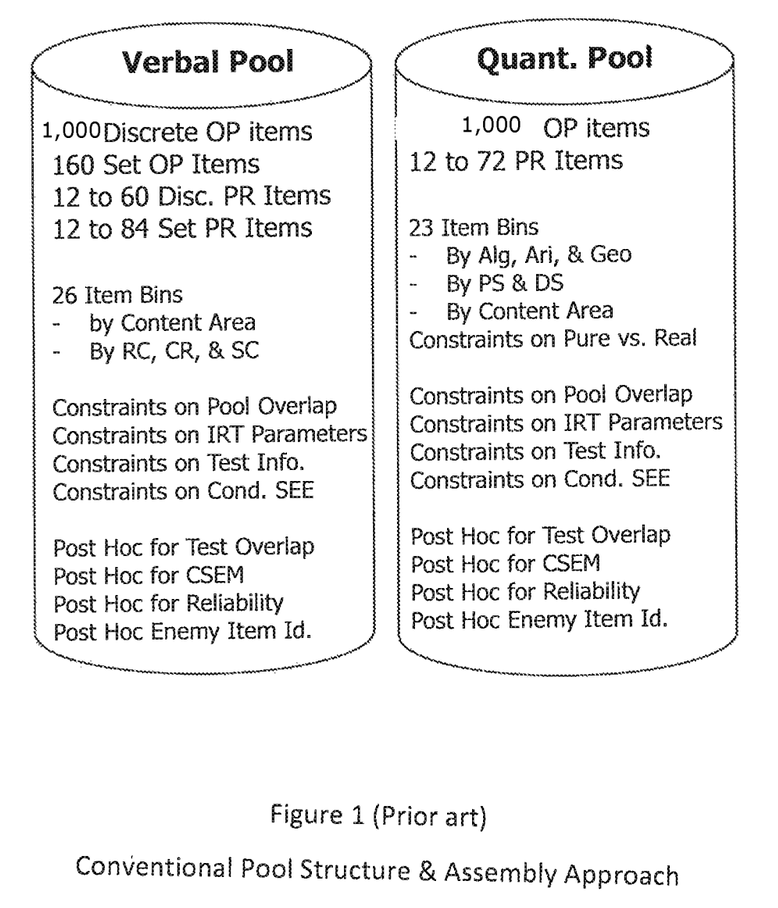
FIG. 1 illustrates a conventional (prior art) pool structure and assembly approach to creating a test.

FIG. 1 illustrates the current pool structure and assembly approach to creating a test, as practiced by ACT, Inc. which administers the ACT test. FIG. 1 shows a sample verbal pool and a sample quant (quantitative) pool. The sample verbal pool may have 1000 discrete operational (OP) items which define 160 sets of OP items, including 12-60 discrete pretest (PR) items and 12-84 sets of PR items. The sample verbal pool includes 26 item bins which are broken down by content area, or by item types (e.g., reading comprehension (RC), critical reasoning (CR), and sentence correction (SC)). Items are selected based on various constraints such as pool overlap, Item Response Theory (IRT) parameters, test information, and conditional standard error of estimation (SEE). The quant pool may have 1000 OP items, and 12-72 PR items. The quant pool includes 23 item bins which are broken down by algebra, arithmetic, and geography, or by problem solving item types (PS) and data sufficiency item types (DS), or by content area. Items are selected based on various constraints such as pure vs. real, pool overlap, IRT parameters, test information, and conditional SEE. For both the verbal and quant pool, post hoc analysis is performed for test overlap, Conditional Standard Errors of Measurement (CSEM), Reliability, and Enemy Item Identification.

The conventional pool assembly may be characterized as having the following approaches and properties, listed below in table format to show the respective approaches and properties, and their respective disadvantage:

TABLE 1

| Conventional pool assembly approaches and properties | Disadvantages |
| --- | --- |
| Iterative random sampling | very time-consuming |
| Top Down/Holistic Approach | i. each iteration for building a whole pool<br>ii. no item-level change allowed |
| Sequential Assembly (one pool at a time) | i. could be greedy<br>ii. could be less than optimal<br>iii. no guaranteed sustainability, even for a few months |
| OP and PR are inseparable in test publication | inflexible PR scheduling |

SUMMARY OF THE INVENTION

The present invention provides a completely different methodology for pool assembly for assembling computerized adaptive test (CAT) pools of test items. An overview of selected differences between conventional approach to pool assembly compared to the approach used in the present invention is summarized in the following table:

TABLE 2

| Conventional pool assembly | Pool assembly in accordance with present invention, and associated advantages over conventional pool assembly |
| --- | --- |
| Iterative random sampling | Linear programming-based optimization<br>Faster and more optimal |
| Top Down/Holistic Approach | Bottom-up/Cellular level construction<br>i. more flexibility under uneven availability of items across Item Collections<br>ii. Cell-level swap/change allowed |
| Sequential Assembly (one pool at a time) | Concurrent Assembly<br>i. No over- or under-shooting to meet targets<br>ii. Minimal maintenance of pool once Honeycomb cells are built |
| OP and PR are inseparable in test publication | OP vs. PR Pool Modulization<br>Separation of PR pools from OP pools<br>Multiple Pools may be online simultaneously<br>More random factors; more robust security |

As discussed in more detail below, the linear programming-based optimization in combination with the bottom-up/cellular level construction drastically improves pool assembly speed. As also discussed in more detail below, the present invention provides a significant improvement to the technical field of assembling computerized adaptive test (CAT) pools of test items. As is well-known in the art, CAT is a form of test delivery in which the items presented to test takers are selected item-by-item by a computer algorithm during delivery of the test, with the goal of adapting the test dynamically to the ability level of each candidate, subject to various additional constraints. CAT algorithms take into consideration factors such as the test taker's responses to previous items, the item response functions of items in the Item Pool, and running estimates of the candidate's ability relative to the items.

BRIEF DESCRIPTION OF DRAWINGS

The patent or application file contains at least one drawing executed in color. Copies of this patent or patent application publication with color drawings will be provided by the Office upon request and payment of the necessary fee.

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

This patent application includes an Appendix having a file named appendix685052-8US.txt, created on Feb. 23, 2021 and having a size of 6,355 bytes. The Appendix is incorporated by reference into the present patent application. One preferred embodiment of the present invention is implemented via the source code in the Appendix. The Appendix is subject to the "Copyright Notice and Authorization" stated above.

The Appendix includes software code to implement a Mixed Integer Programming (MIP) model coded for the IBM® CPLEX® Optimizer platform, as discussed below.

I. Overview

One preferred embodiment of the present invention provides an automated method of assembling CAT pools of test items. The method operates as follows:

1. A plurality of item bins (content domains) are created. Each item bin is associated with a different content domain, and each item bin includes only items associated with its respective content domain.

2. The items in each item bin are grouped into a plurality of individual cells. Each item is placed in only one of the individual cells, and each cell includes a plurality of items which span a range of difficulty levels. The grouping is performed by linear programming at the individual cell level. At least some of the item bins may have a different number of individual cells.

3. One or more pools of items are assembled. Each pool of items is assembled from a random selection of cells across the item bins, wherein there is only one cell from each item bin. In one embodiment, each cell in an assembled test includes only one item. In another embodiment, each cell in an assembled test includes a plurality of items. Tests may be assembled for a plurality of different time windows (schedules), wherein a pool of items is assembled for each test taker within each time window. In this manner, each time window has its own pool of items assembled from a random selection of cells across the item bins.

4. The CAT is administered by randomly assigning each test taker to one of the pools of items.

As discussed in step 2 above, the grouping is performed by linear programming at the individual cell level. By performing the grouping in this manner, as opposed to prior art processes which perform the grouping at the pool level, at least a magnitude improvement in speed and efficiency is achieved in the test item pool assembly process.

II. Detailed Disclosure

Figure 2:
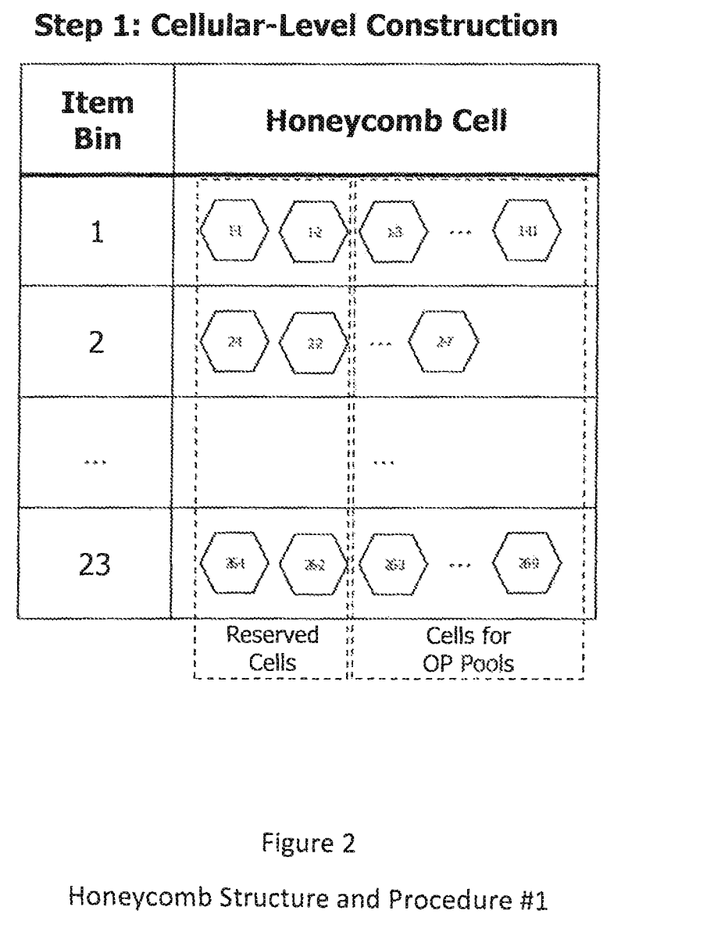
FIGS. 2 and 3 illustrate the honeycomb structure and assembly approach to creating a test in accordance with preferred embodiments of the present invention.
Figure 3:
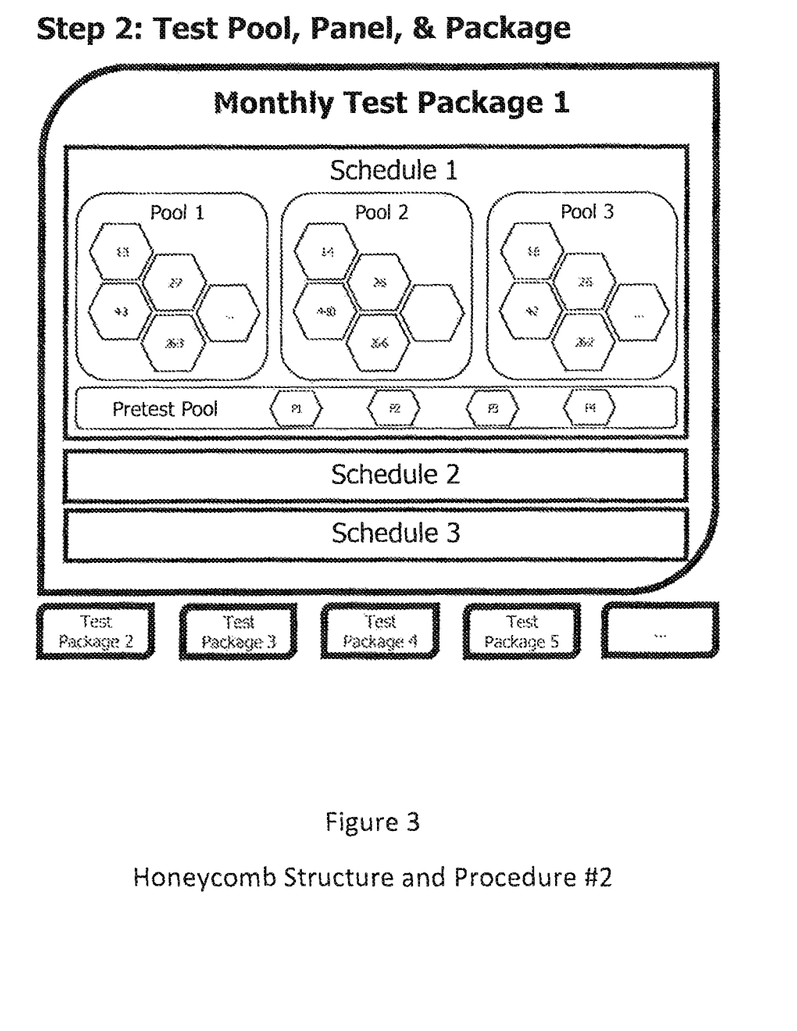

FIGS. 2 and 3 illustrate respective steps 1 and 2 of the honeycomb structure and assembly approach to creating a test. FIG. 2 illustrates the cellular-level construction by showing a plurality of item bins (content domains), and a plurality of honeycomb cells for each item bin. Each honeycomb cell includes a plurality of items, such as 20-40 items per cell, ranging in difficulty from easy items to hard items. In this example, there are 23 item bins, meaning that this particular test is a 23-item test. That is, one item is selected from one of the cells associated with each item bin.

FIG. 2 illustrates the contents of the honeycomb cells for item bins 1, 2, and 23. Item bin 1 has cells 1-1 through 1-11, item 2 has cells 2-1 through 2-7, and item 23 has cells 26-1 through 26-9. There are no overlapping items across cells. Preferably, there is a different number of cells for each item bin. This cell structure provides numerous benefits including better utilization of the overall item bank, improved item exposure control, and a process that allows items to be easily pulled out from operation by cell.

In this example, cells 1 and 2 are "reserved" cells, and the remaining cells are for operational (OP) pools. For security reasons, the reserved cells are excluded from the pool assembly. The items in the reserved cells may be used for other product developments, such as the test preparation materials for GMAT test takers, Essential Skills Assessment (ESA) test administered by GMAC®, Executive Assessment (EA) administered by GMAC, and others. The items in the reserved cells may also be used for emergency backup pool creation.

The honeycomb structure allows for "enemy item" identification to be performed at the cell level. ("Enemy item" refers to two or more items that should not be administered to the same individual test taker on one test because of the adverse effects on content sampling and item independence.) Each cell needs to meet a requirement which is specified by a test information function for each honeycomb cell (also referred to herein as "Cell Information Function" (CIF)) to control standard error of test scores.

FIG. 3 show Step 2 of the honeycomb structure and assembly approach to creating a test. This example illustrates the creation of monthly test packages 1, 2, 3, 4, 5, . . . . In this illustration, the details of monthly test package 1 are shown. The monthly test package has three schedules 1-3 representing respective time windows 1-3. During schedule 1 (time window 1), three pools are formed, along with four pretest pools. While not illustrated, schedules 2 and 3 include similar pools and pretest pools. Additional monthly test packages may also be formed during Step 2, as illustrated in FIG. 3 which shows at least five additional test packages. These test packages have the same elements as test package 1.

Referring again to the three pools in schedule 1, each pool is constructed of one cell selected from each of the 23 item bins of FIG. 2. In this example, the pools illustrate the following cells:

Pool 1: cell 1-3, 2-7, 4-3, 26-3, and so on
Pool 2: cell 1-4, 2-5, 4-10, 26-6, and so on
Pool 3: 1-8, 2-6, 4-2, 26-2, and so on.

As noted above, there are 23 cells in each pool. Thus, while only four cells are identified by their cell number, there are 19 additional cells with identifiable cell numbers in each pool. As discussed above, there may be about 20-40 items per cell. In this example, there are about 600 items per pool (average of 26 items per cell).

The order of cells to draw items from is determined at the time of test administration. Thus, in the example Pool 1 above, one test taker might begin with an item from cell 4-3, whereas another test taker might begin with an item from cell 2-7. Subsequent cells may be either predetermined at the beginning of test administration, or selected on-the-fly during test administration. The items selected from the respective cells are determined on-the-fly during test administration based on interim scores, in the same manner as a conventional CAT item selection procedure. The test taker may receive one item from each cell, or multiple items from each cell for certain test sections, such as verbal reasoning.

In one assembly example, 54 pools are concurrently assembled, which is enough pools for 6 months of testing (9 pools per month (three schedules per month)×6=54). The cells may be manually or randomly selected.

A simulation is performed for each pool, at the pool level, for evaluation and quality control purposes.

There is no overlap of items or cells across pools within a schedule, but the same cell may be included in multiple pools, so long as the pools are in different schedules. All pools in a schedule are live simultaneously and one of them is randomly selected for each test administration. Pretest data is collected by the unit of the test schedule.

Test operation/maintenance occurs mostly at the cell level. This greatly improves operational efficiency and provides for cost reduction, as further discussed below.

Items are regularly evaluated and addressed for item parameter drift (IPD). IPD is the phenomenon in which the parameter values for the same test items change systematically over multiple testing occasions. One potential cause for IPD is item exposure or cheating.

Referring again to FIG. 3, there are multiple pools per schedule, and each test taker for a given schedule is randomly assigned to one of the pools. Thus, since there will almost always be more than three test takers per schedule, multiple test takers will receive the same pool. In an alternative embodiment, there may even be only one pool per schedule in which case all test takers will be assigned to that one pool.

Even though multiple test takers for a specific test date (same schedule) will be assigned to the same pool, each test taker will likely receive a different subset of items from the respective cells to answer, since the test is a CAT-type test.

III. Improvement to Technical Field

Assembling computerized adaptive test (CAT) pools of test items is a highly technical field that requires a complex combination of computer techniques. See, for example, the following technical article:

Kyung T. Han and Lawrence M. Rudner. "Item Pool Construction Using Mixed Integer Quadratic Programming (MIQP)," GMAC Research Reports•RR-14-01•Jun. 10, 2014.

The honeycomb-based pool assembly method described above dramatically improves the test item pool assembly process for computerized adaptive test development used in tests such as the GMAT in at least two major ways. First, it provides a substantial improvement in test item pool parallelism (consistency in test item pool performance and characteristics across constructed pools). Second, it dramatically reduces processing time for test assembly.

Figure 4:
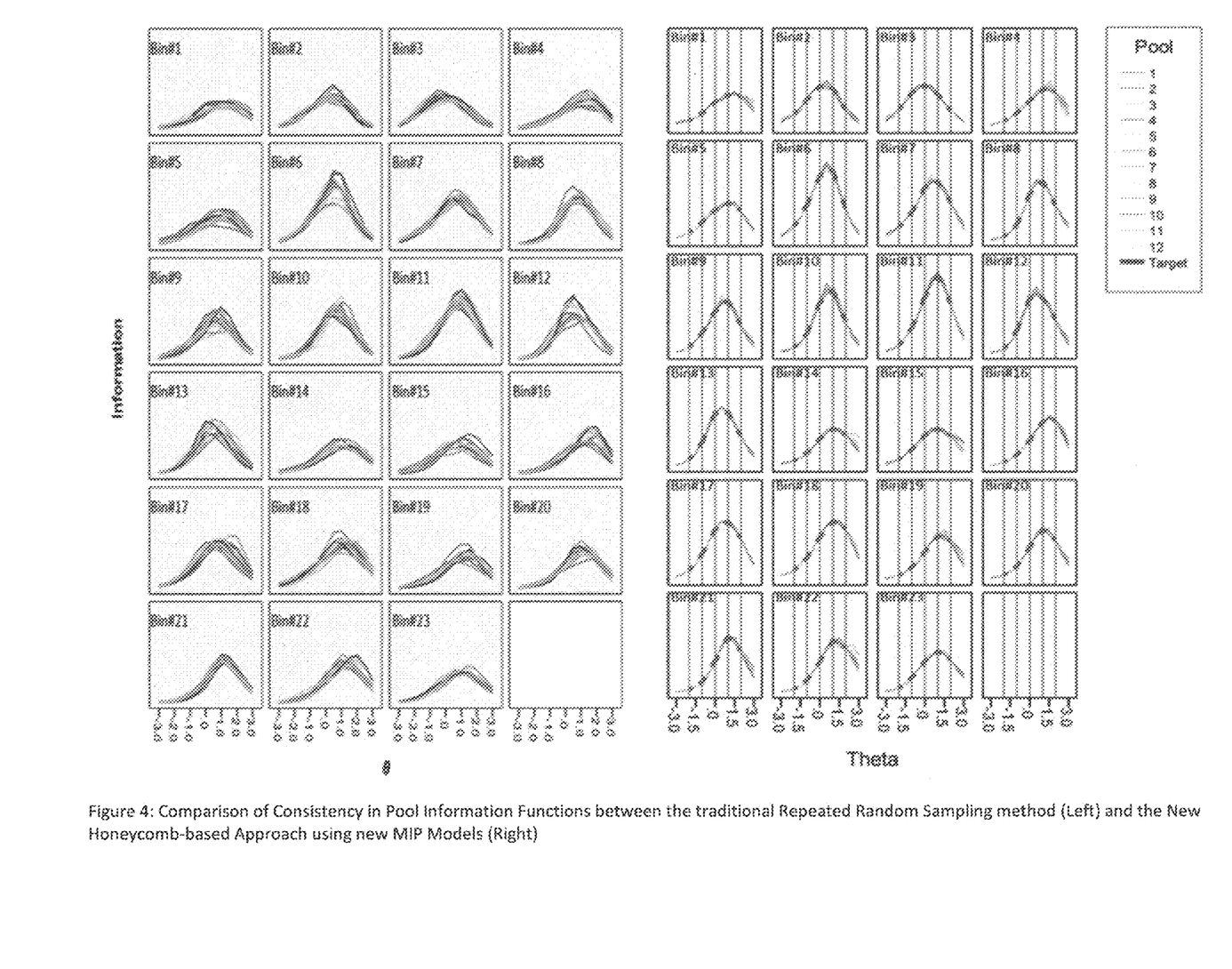
FIGS. 4 and 5 graphically illustrate how the honeycomb structure and assembly approach provides an improvement to the technical field of assembling computerized adaptive test (CAT) pools of test items.

FIG. 4 illustrates the substantial improvement in test item pool parallelism. Referring to FIG. 4, the bins on the lefthand side illustrate conventional manual pool assembly, and the bins on the righthand side illustrate pool assembly using the honeycomb framework of the present invention. As illustrated in FIG. 4, the bins on the righthand side show that the pools are significantly more parallel to one another, almost appearing as a single curve, compared to the less parallel curves of the bins on the lefthand side. This improvement in parallelism indicates improved consistency in standardization of the test.

Regarding the processing time improvement, typical processing time for pool assembly is about 12-48 hours when the traditional repeated random sampling method is used and is about 48-240 hours using the conventional Mixed Integer Programming (MIP) method. With the honeycomb-based pool assembly method described above, in which new MIP objective functions have been developed and applied, the processing time has been reduced to about 1-2 hours given the same test pool specification and computer hardware performance.

Figure 5:
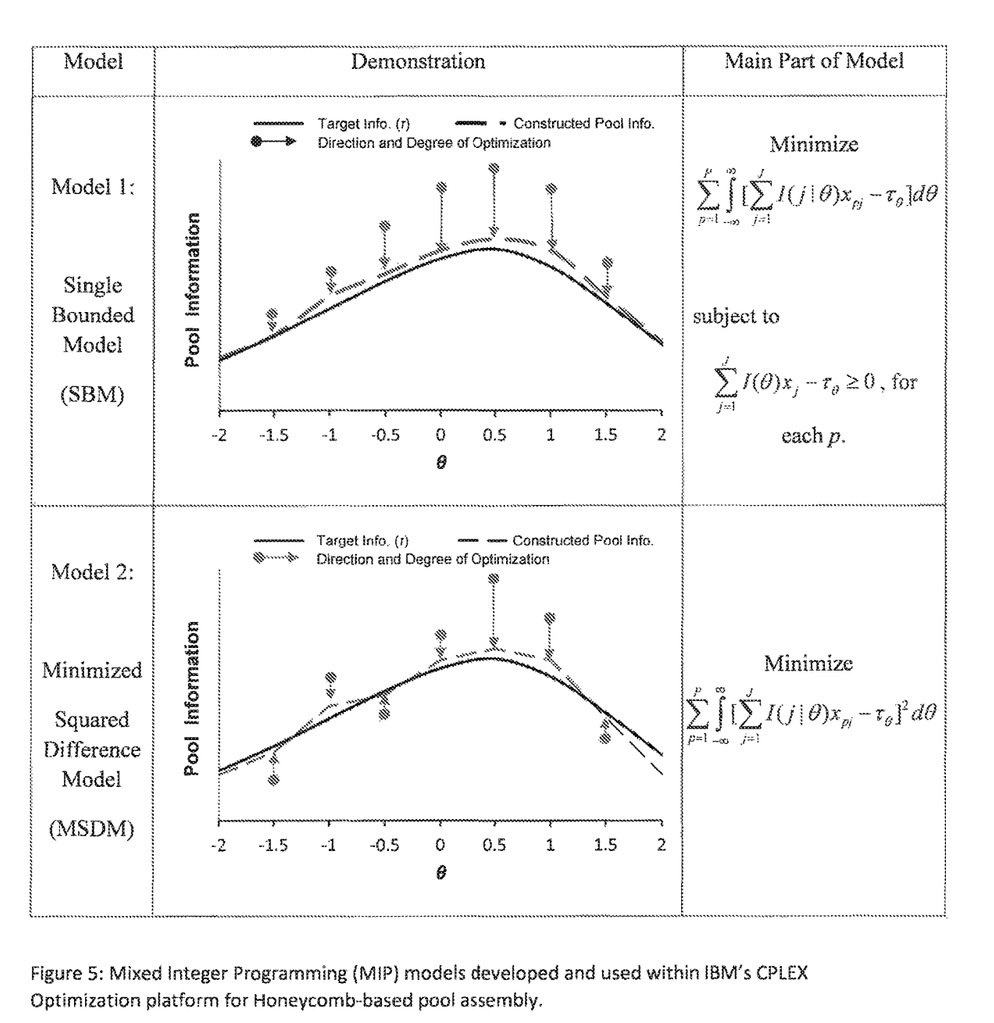

FIG. 5 illustrates MIP models for implementing the honeycomb-based pool assembly. As known in the art, linear programming maximizes (or minimizes) a linear objective function subject to one or more constraints. Mixed integer programming (MIP) adds one additional condition that at least one of the variables can only take on integer values. That is, MIP is a subset of linear programming.

IV. Hardware/Software

Figure 6:
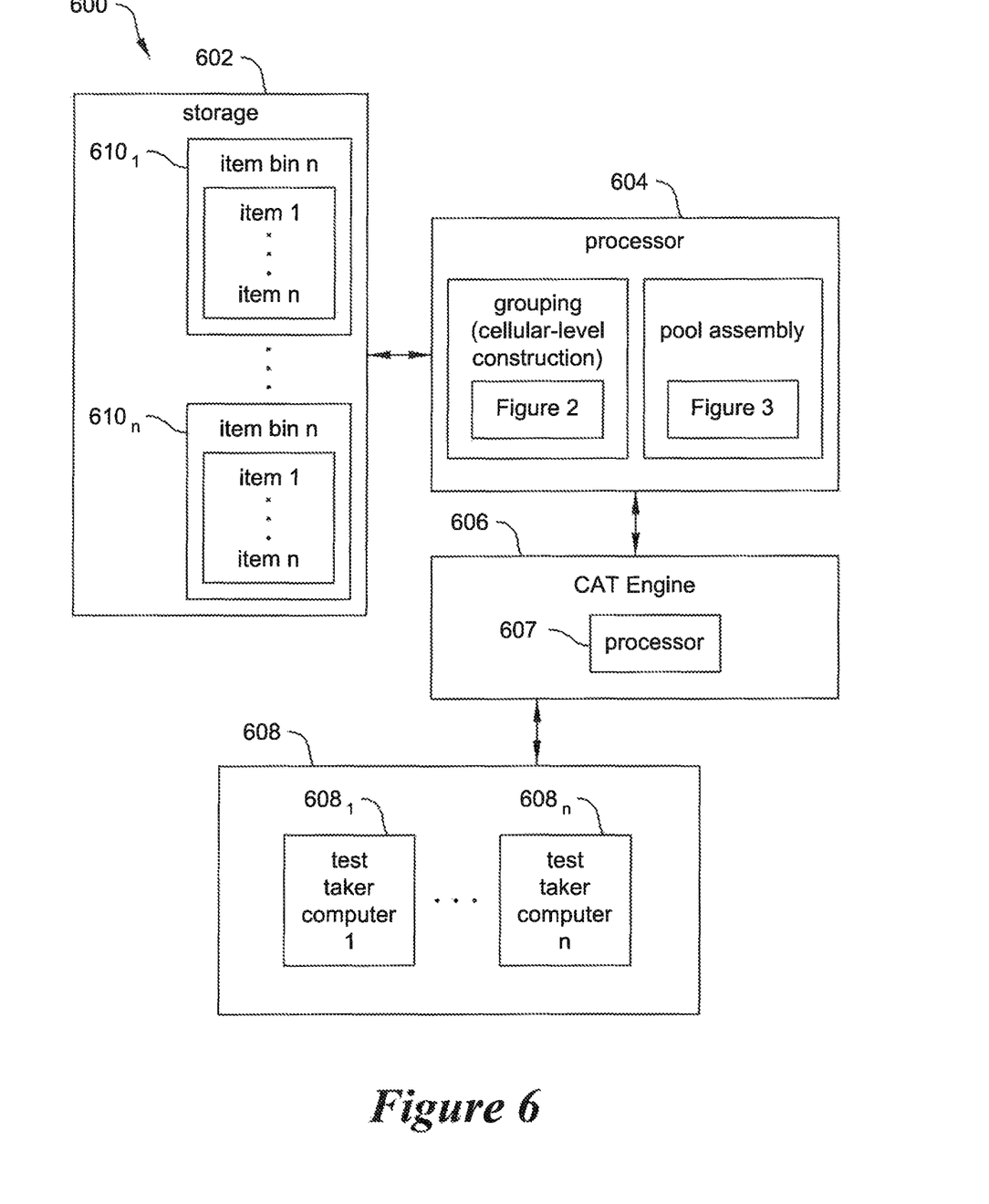
FIG. 6 shows system hardware/software architecture for implementing one preferred embodiment of the present invention.

FIG. 6 shows system hardware/software architecture for implementing one preferred embodiment of the present invention. System 600 includes storage 602, processor 604, CAT engine 606 having processor 607, and test taker computers $608_1$-$608_n$. The storage 602 stores a plurality of item bins 1-n, labeled as $610_1$-$610_n$. Each item bin 610 includes a plurality of items. The processor 604 groups the items in each item bin 610 into a plurality of individual cells, as illustrated in FIG. 2. The processor also assembles one or more pools of items, as illustrated in FIG. 3. The CAT engine 606 randomly assigns each test taker to one of the pools of items, and administers the test for each schedule to the test takers via their respective computers 608. The administration of a CAT is a well-known function of a CAT engine, and thus is not further described herein.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors (e.g., processors 604 and 607), whether provided in a single computer or distributed among multiple computers.

The present invention can also be included in an article of manufacture (e.g., one or more computer program products) having, for instance, non-transitory computer readable storage media. The storage media has computer readable program code stored therein that is encoded with instructions for execution by a processor (e.g., processors 604 and 607) for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" and "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of assembling computerized adaptive test (CAT) pools of test items for administration to test takers, the method comprising:
 (a) creating a plurality of item bins, each item bin being associated with a different content domain, each item bin including only test items associated with its respective content domain;
 (b) grouping the test items in each item bin into a plurality of individual cells, wherein each test item is placed in only one of the individual cells, and each cell includes a plurality of test items which span a range of difficulty levels,
  wherein the grouping is performed by linear programming at the individual cell level;
 (c) assembling, by a processor, a plurality of pools of test items, each pool of test items being assembled from a random selection of cells across the item bins, wherein there is only one cell for each item bin;
 (d) randomly assigning, by a computer, each test taker to one of the plurality of pools of test items; and
 (e) administering a CAT to the test takers using their randomly assigned respective pool of test items,
  wherein all of the test items in the administered CAT to be potentially presented to each test taker is in the one pool of test items that is randomly assigned to the respective test taker.

2. The method of claim 1 wherein each cell in the CAT includes only one test item.

3. The method of claim 1 wherein each cell in the CAT includes a plurality of test items.

4. The method of claim 1 wherein step (c) is performed for a plurality of different time windows, each time window having its own pools.

5. The method of claim 1 wherein at least some of the item bins have a different number of individual cells.

6. The method of claim 1 wherein the linear programming is mixed integer programming.

7. An automated system for assembling computerized adaptive test (CAT) pools of test items, the system comprising:
- (a) a storage device configured to store a plurality of item bins, each item bin being associated with a different content domain and including a plurality of test items associated with its respective content domain;
- (b) a processor configured to group the test items in each item bin into a plurality of individual cells, wherein each item is placed in only one of the individual cells, and each cell includes a plurality of test items which span a range of difficulty levels, and wherein the grouping is performed by linear programming at the individual cell level,
  - the processor further configured to assemble a plurality of pools of test items, each pool of test items being assembled from a random selection of cells across the item bins, wherein there is only one cell for each item bin; and
- (c) a CAT engine configured to randomly assign each test taker to one of the plurality of pools of test items,
  - wherein a CAT is administered to the test takers using their randomly assigned respective pool of test items, and
  - wherein all of the test items in the administered CAT to be potentially presented to each test taker is in the one pool of test items that is randomly assigned to the respective test taker.

8. The system of claim 7 wherein each cell in the CAT includes only one item.

9. The system of claim 7 wherein each cell in the CAT includes a plurality of test items.

10. The system of claim 7 wherein the processor is configured to assemble the CAT for a plurality of different time windows, each time window having its own pools.

11. The system of claim 7 wherein at least some of the item bins have a different number of individual cells.

12. The system of claim 7 wherein the linear programming is mixed integer programming.

13. The system of claim 7 wherein the plurality of individual cells comprise one or more cells for the plurality of pools of test items and one or more reserved cells that are excluded from the pool assembly.

14. A non-transitory computer-readable storage medium comprising instructions which, when executed by a computer, cause the computer to:
- (a) create a plurality of item bins, each item bin being associated with a different content domain, each item bin including only test items associated with its respective content domain;
- (b) group the test items in each item bin into a plurality of individual cells, wherein each item is placed in only one of the individual cells, and each cell includes a plurality of test items which span a range of difficulty levels,
  - wherein the grouping is performed by linear programming at the individual cell level;
- (c) assemble a plurality of pools of test items, each pool of test items being assembled from a random selection of cells across the item bins, wherein there is only one cell for each item bin;
- (d) randomly assign each test taker to one of the plurality of pools of test items; and
- (e) administer a CAT to the test takers using their randomly assigned respective pool of test items
  - wherein all of the test items in the administered CAT to be potentially presented to each test taker is in the one pool of test items that is randomly assigned to the respective test taker.

15. The non-transitory computer-readable storage medium of claim 14 wherein each cell in the CAT includes only one item.

16. The non-transitory computer-readable storage medium of claim 14 wherein each cell in the CAT includes a plurality of test items.

17. The non-transitory computer-readable storage medium of claim 14 wherein the assembling is performed for a plurality of different time windows, each time window having its own pools.

18. The non-transitory computer-readable storage medium of claim 14 wherein at least some of the item bins have a different number of individual cells.

* * * * *